April 7, 1970   A. S. IRWIN   3,504,903
DOUBLE ACTING LAMINATED BEARING FLEXIBLE JOINT
Filed Aug. 22 1967   3 Sheets-Sheet 3

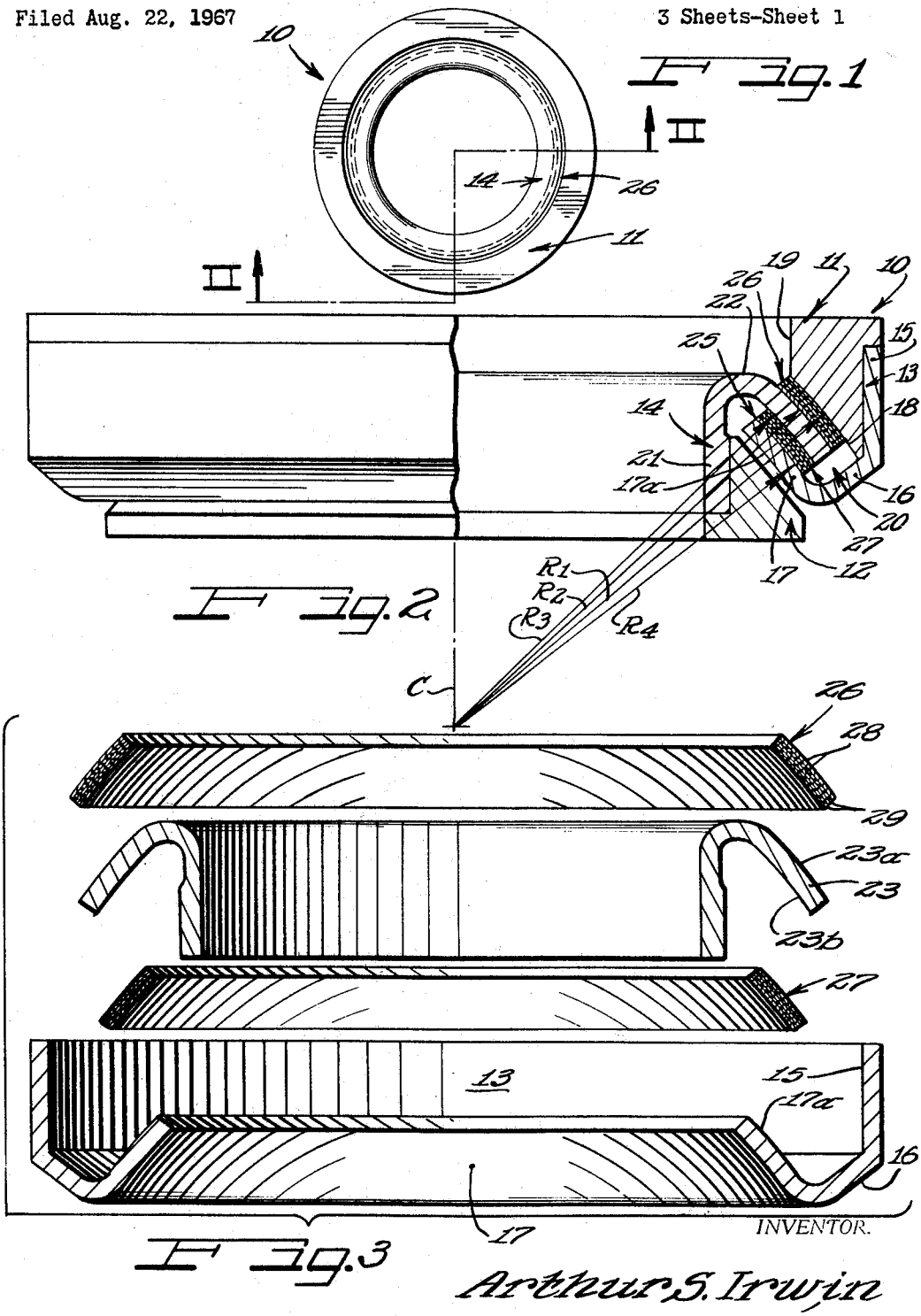

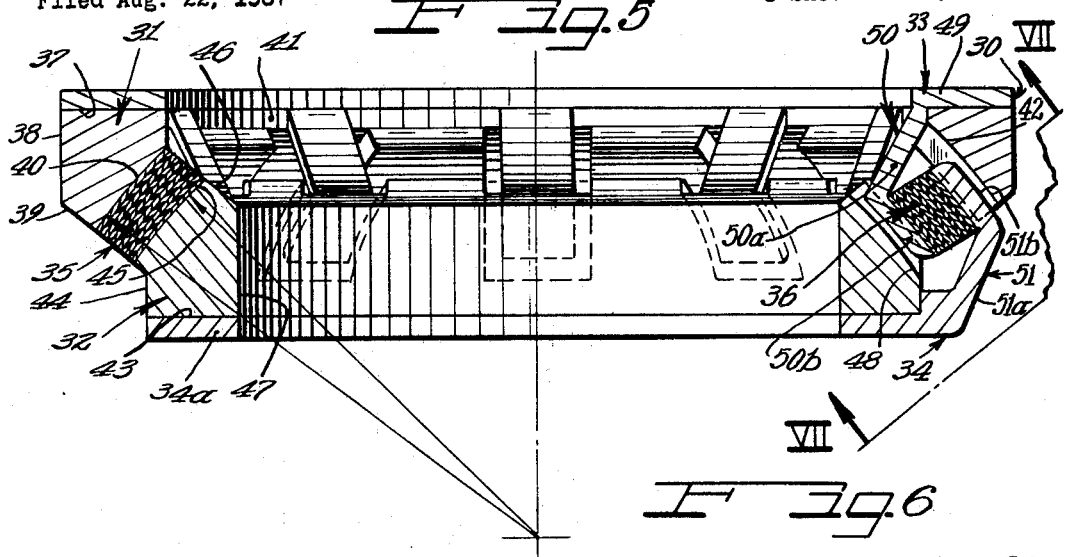

INVENTOR.
Arthur S. Irwin
BY Hill, Sherman, Meroni, Gross & Simpson
ATTORNEYS

United States Patent Office 3,504,903
Patented Apr. 7, 1970

3,504,903
DOUBLE ACTING LAMINATED BEARING
FLEXIBLE JOINT
Arthur S. Irwin, Jamestown, N.Y., assignor to TRW Inc.,
Cleveland, Ohio, a corporation of Ohio
Filed Aug. 22, 1967, Ser. No. 662,383
Int. Cl. F16f 1/14; B21k 1/12, 1/14
U.S. Cl. 267—1                                    7 Claims

ABSTRACT OF THE DISCLOSURE

A tilting bearing or swivel joint especially adapted for mounting nozzles on rocket engines to accommodate tilting of the nozzle about a fixed axis and having mounting rings joined by laminated bearings composed of a stack of bonded together alternate thin layers of elastomer and nonelastomeric bearing material such as metal. The bearing stacks are relatively incompressible but yield to shear forces to permit relative tilting of the mounting rings. Since the bearing stacks lose some of their advantageous structural characteristics which they possess in compression when placed under tension, the stacks are protected from destructive tension creating forces by supplemental stacks arranged so that any tension force tending to pull the mounting rings apart will create a compression force in the supplementary stack.

BACKGROUND OF THE INVENTION

Field of the invention

The invention relates to the art of laminated bearings and swivel joints having relatively tiltable members joined by one or more stacks of laminae composed of alternate bonded together metal and elastomer layers at least some of which remain in compression under all conditions of operation.

DESCRIPTION OF THE PRIOR ART

Thin laminae laminated bearings are known for example in the William L. Hinks patent, No. 2,900,182, granted Aug. 18, 1959 from an application filed Apr. 27, 1955. Such bearings are composed of alternate layers of metal and elastomer bonded together, with the elastomer layers being uniform in thickness and substantially incompressible so that the axial height of the bearing stack will be maintained even under heavy loads. These bearings yield to shear forces by interparticle elastic displacement of the elastomer so that the metal layers can shift, thereby permitting the stack to yield and accommodate relative motion between parts supported thereby. Such thin laminae laminated bearings, while capable of supporting heavy compression loads, may be relatively weak under tension and rapidly lose their structural characteristics.

SUMMARY OF THE INVENTION

The present invention now provides supplemental laminated bearing stacks which will absorb tension loads and prevent loss of function and damage to the bearing stacks.

In one form of the invention, two spherical laminate sections are utilized with an intermediate member secured therebetween and arranged so that one section is under compression load even when the other section may be subjected to tension load.

In a second embodiment of the invention, the laminate sections are in the form of circular disks or buttons and are arranged between mounting members in circumferentially spaced relation with supplementary laminate buttons interposed between fingers carried by the mounting members so that tension loads on the primary set of buttons will be resisted by compression loads on the supplementary buttons.

The laminate bearing sections can be preloaded between the mounting rings for maintaining some degree of compression loads thereon, even when the assembly is subjected to tension forces. The preloading of the laminate sections increases the rigidity of the assembly.

It is then an object of this invention to provide a laminated bearing assembly having a plurality of laminate sections cooperating to absorb tension forces for avoiding tension in the load carrying laminates.

Another object of this invention is to provide a double acting laminated bearing or swivel joint with main and supplemental laminate sections cooperating to prevent application of tension stresses to the main section.

A further object of this invention is to provide a swivel joint especially adapted for mounting nozzles on rocket engines and having a plurality of laminated bearings supporting the nozzles in articulate relation relative to the engine and cooperating with secondary laminated bearings which will prevent application of undue tension stresses to the load carrying laminated bearings.

Another object of this invention is to provide a swivel joint with relatively tilting mounting rings supported and coupled through a plurality of laminated bearing sections arranged to protect each other against undue tension loads.

Other and further objects of this invention will be apparent to those skilled in the art from the following detailed description of the annexed sheets of drawings which show several embodiments of the invention.

BRIEF DESCRIPTION OF THE DRAWINGS

FIGURE 1 is a top plan view of a first form of double acting laminated bearing swivel joint according to this invention;

FIGURE 2 is a cross-sectional view with parts in elevation taken along the line II—II of FIGURE 1;

FIGURE 3 is an exploded cross-sectional view of the spherical laminate sections and mounting ring components for the joint of FIGURES 1 and 2;

FIGURE 4 is a top plan view of a second embodiment of the invention using button-type laminate sections;

FIGURE 5 is a cross-sectional view taken along the line V—V of FIGURE 4;

FIGURE 6 is a view similar to FIGURE 5, but showing the assembly in tilted position;

FIGURE 7 is a fragmentary elevational view taken generally along the line VII—VII of FIGURE 5;

DESCRIPTION OF THE PREFERRED EMBODIMENTS

Figure 8:
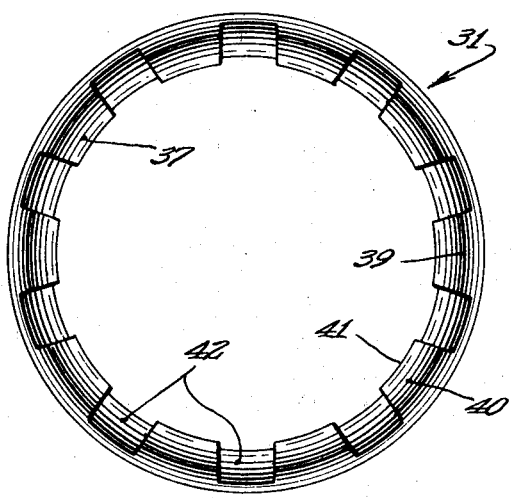
FIGURE 8 is a top plan view of the support ring of the joint.

The bearing or joint 10 of FIGURES 1 and 2 includes a top mounting ring 11 for attachment to a rocket engine body or the like, a bottom mounting ring 12 for attachment to an exit nozzle or cone of the rocket engine, a first support ring or collar 13 secured to the mounting ring 11, and a second support ring or collar 14 secured to the mounting ring 12. The collar 13 has an upstanding cylindrical peripheral wall 15 embracing the periphery of the mounting ring 11 and fixed thereto as by press-fit, welding, or the like. A bottom flange 16 of the collar 13 underlies the mounting ring 11 and slopes downwardly and inwardly to an upturned flange 17 in right angle relation to the bottom wall or flange 16.

The mounting ring 11 has a fragmental spherical bottom wall or face 18 extending from the bottom wall 16 of the collar 13 to a cylindrical bore or central aperture 19 through the mounting ring 11. This bottom wall 18 and the upturned flange 17 of the collar 13 provide therebetween an annular chamber or groove 20 closed at the bottom by the wall 16 and open at the top into the bore 19 of the mounting ring 11.

The support ring or collar 14 has an upstanding cylindrical wall 21 press-fitted or otherwise secured into the mounting ring 12 and projecting thereabove to an outturned top wall 22 with a downwardly inclined lip or flange 23 surrounding and spaced upwardly from the mounting ring 12.

The mounting ring 12 has a conical outer periphery 24 spaced from this flange 23 to provide therebetween a downwardly opening annular chamber or groove 25 closed at the top by the top wall 22 and open at the bottom to the periphery of the mounting ring 12.

The flange 23 extends into the chamber or groove 20 and terminates in spaced relation from the bottom wall 16 of the collar 13.

A first spherical laminate bearing section 26 is mounted in the groove or chamber 20 between the surface 18 and the flange 23 and a second spherical laminate bearing section 27 is mounted in this chamber or groove between the flange 23 and the flange 17.

As best shown in FIGURE 3, each bearing section 26 and 27 is composed of a stack of alternating metal layers 28 and elastomer layers 29 in bonded face-to-face relation, as more fully described in the aforesaid Hinks patent, No. 2,900,182. The stacks are substantially incompressible, but the layers in the stacks can shift relative to each other under torsion or shear loads to accommodate swivel or tilting action.

The end laminae of the bearing 26 are bonded respectively to the end wall 18 of the mounting ring 11 and to the top surface 23a of the collar flange 23.

The end laminae of the bearing 27 are bonded respectively to the bottom face 23b of the flange 23 and the top face 17a of the flange 17.

As best shown in FIGURE 2, the surfaces or faces 18, 23a, 23b and 17a are arcuate, being struck by radii $R_1$, $R_2$, $R_3$ and $R_4$ from the same center line C which is the central axis of the joint 10. Thus, these surfaces or faces are segments of spheres and are in concentric relation.

The bearings 26 and 27 are also preferably composed of fragmental spherical laminate sections 28 and 29, but if desired, these bearings can be made with initially conical sections and deformed into conforming relationship with the surfaces between which they are interposed.

It is preferred that the bearings 26 and 27 be compressibly loaded between the surfaces 18 and 23a and between the surfaces 23b and 17a, and for this purpose, the groove or annular chamber 20 is narrower than the free stacking height of the bearings and the flange 23. The desired preload can be obtained by control of the width of the groove 20.

As will be evident from FIGURE 2, any tension load tending to separate the mounting rings 11 and 12 will result in a compression load on the bearing section 27, while any compression load tending to force the rings 11 and 12 toward each other will result in compression loading of the bearing 26. Thus, both bearings 26 and 27 cooperate to protect each other against undue tension loads on either bearing. The preload on the bearings can be such that neither bearing is ever completely relieved from a compression load.

The flange 23 rigidifies the laminated bearing support between the rings 11 and 12 against buckling which might occur if the rings 11 and 12 were connected by a single bearing stack.

The rings 11 and 12 are tiltable relative to each other about the fixed center C by shifting of the metal layers 28 in the bearings 26 and 27 relative to the elastomer layers 29. Since the elastomer layers are very thin and substantially incompressible between the metal layers, this shifting will not vary the axial relationship of the rings 11 and 12.

In the second embodiment of the invention, the bearing or swivel joint 30 shown in FIGURES 4 to 6 includes a top or first mounting ring 31, a bottom or second mounting ring 32, a support ring 33 secured to the ring 31, and a second support ring 34 secured to the ring 32. A ring of circumferentialy spaced laminated bearing buttons or disks 35 directly connect the rings 31 and 32 while a ring of circumferentially spaced supplementary laminated bearing buttons or disks 36 alternate with the buttons 35 and connect the fingers of the rings 33 and 34.

As best shown in FIGURES 5 and 8, the ring 31 has a flat top 37, a cylindrical outer periphery 38, a downwardly and inwardly extending beveled portion 39, and an arcuate bottom wall 40 extending upwardly and inwardly from the bevel 39 to a cylindrical bore 41.

Vertcial grooves or notches 42 are provided along the length of the bore in circumferentially spaced relation.

Figure 10:
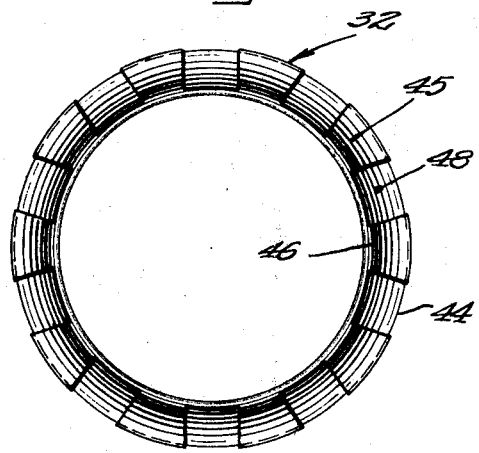
FIGURE 10 is a top plan view of the supported ring of the joint.

The ring 32, as best shown in FIGURES 5 and 10 has a flat bottom 43, a cylindrical outer peripheral wall 44, an arcuate top wall 45 extending from the cylindrical wall 44 to a downwardly and inwardly beveled wall 46 which, in turn, extends to a cylindrical bore 47. The top wall 45 has circumferentially spaced notches 48 therein.

Figure 9:
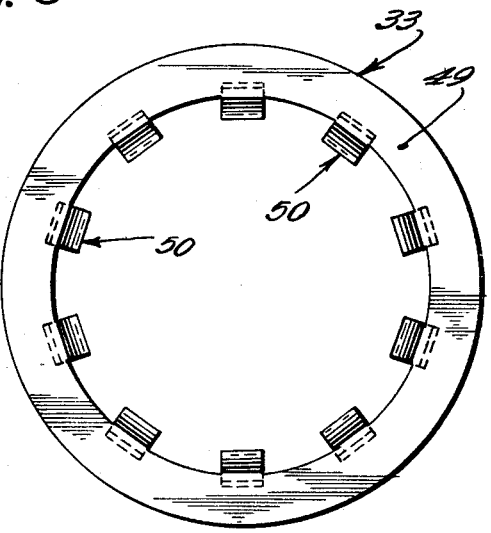
FIGURE 9 is a top plan view of the finger ring cooperating with the ring of FIGURE 8.

As best shown in FIGURES 5 and 9, the ring 33 has a flat flange 49 overlying the flat top face 37 of the ring 31 with circumferentially spaced fingers 50 depending from the inner periphery of the flange 49 and each including inwardly and downwardly sloping portions 50a and outturned downwardly sloping flange portions or lips 50b extending across the notches or slots 48 of the ring 32, but in spaced relation therefrom.

While the fingers 50 are illustrated as formed on a ring 33, it should be understood that individual fingers could be used with the ring 31 having notches in the top face 37 thereof to receive the individual finger segments. Of course, it will be understood that the ring 33 or the finger segments are affixed to the ring 31.

Figure 11:
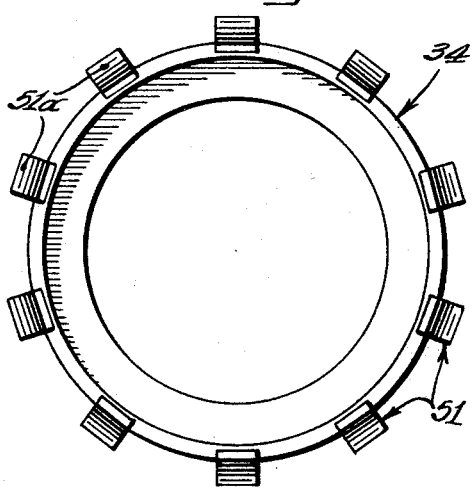
FIGURE 11 is a top plan view of the support ring cooperating with the ring of FIGURE 10.

As best shown in FIGURES 5 and 11, the bottom ring 34 has an annular portion 34a underlying the flat bottom 43 of the ring 32 and affixed thereto, together with circumferentially spaced fingers 51 aligned with the fingers 50 and having upwardly and outwardly inclined portions 51a and inturned lips or flange portions 51b in the grooves or notches 42 of the ring 31.

If desired, the fingers 51 could be individual units having flanges seated in slots provided in the bottom face of the ring 32 and anchored thereto as by welding, etc.

Figure 12:
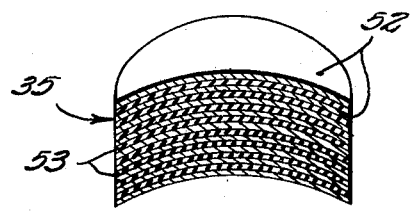
FIGURE 12 is a perspective view of one of the main spherical laminate buttons for the joint of FIGURES 4 to 6.

The main laminated bearing buttons 35, shown in detail in FIGURE 12, are composed of bonded together alternating thin metal and elastomer layers 52 and 53 which, in the preferred embodiment, are of spherical configuration to mate the faces 40 and 45 of the rings 31 and 32 and the end laminae of these bearings are integrally bonded to these arcuate surfaces of the rings. It is to be understood, however, that the buttons 35 may be constructed of flat layers which, in operation, will be pressed into conformity with the faces 40 and 45. As shown in FIGURE 4, the buttons 35 are spaced circumferentially and alternate with the fingers 50.

Figure 13:
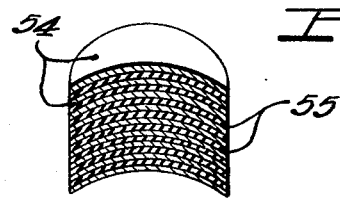
FIGURE 13 is a perspective view of a supplementary laminate button for the joint of FIGURES 4 to 6.

The laminated bearing buttons 36, as shown in FIGURE 13, constitute a stack of bonded together alternating metal and elastomer layers 54 and 55 which, like the layers of the buttons 35, may be flat, but which, in the preferred embodiment, are of spherical configuration to mate with the lips or flanges 50b and 51b of the fingers 50 and 51 with the end laminae being bonded to these fingers.

It will be understood that the arcuate surfaces 40 and 45 of the rings 31 and 32 and the surfaces of the finger flange portions 50b and 51b are struck from radii centered on the central axis of the joint 30 so that when the rings 31 and 32 are tilted relative to each other as shown in FIGURE 6, the tilting axis will be about this center line.

The bearing buttons 35 bear the main thrust load of the joint in operation, but whenever the joint is subject to tension loads which tend to separate the rings 31 and 32, the supplementary bearing buttons 36 will be subjected to compression loads, thereby limiting the tension forces applied to the buttons 35. Thus, as in the first embodiment, one set of laminated bearings is always under compression load and is effective to limit the tension forces which might otherwise be applied to the bearings. As in the first embodiment, the tilting of the rings is effected by shifting of the metal laminae accommodated by interparticle elastic displacement of the elastomer laminae. The bearing stacks 35 and 36 are substantially incompressible, but the metal laminae may shift to the positions shown in FIGURE 6 to accommodate the tilting of the joint.

From the above descriptions, it will, therefore, be understood that the invention provides a double acting laminated bearing joint or bearing assembly having a plurality of sets of laminated bearing stacks arranged to complement each other and prevent undue tensioning of the bearings. While the invention is particularly described in connection with the swivel joints for rocket nozzles, it should be understood, however, that the principles of the invention are generally applicable to laminated bearings and the prevention of undesired stresses therein and, therefore, the patent to be granted on this application is not to be limited to the particular described embodiments.

I claim:

1. A double acting laminated bearing assembly comprising first, second and third bearing member segments in spaced relation, said second segment projecting between said first and third segments, first and second laminated bearings, said first bearing connecting and bonded to said first and second segments, said second bearing connected and bonded to said second and third members, one of said bearings compressively absorbing tension loads applied to the other of said bearings, and said first and said third segments joined together in nonmovable relation.

2. A swivel bearing comprosing a first member having spaced opposed surfaces, a second member having opposite surfaces between and separate from said opposed surfaces, a first laminated bearing stack between and bonded to one of said opposed surfaces and the adjacent opposite surface of the second member, a second laminate bearing stack between and bonded to the other of said opposed surfaces and the other adjacent opposite surface of the second member, the said first and said second members relatively movable, and one of the said bearing stacks compressively absorbing tension load applied to the other of said bearing stacks.

3. A swivel joint comprising a pair of concentric ring members, a plurality of stacks of laminated bearings connecting said members, each of said stacks comprising bonded together thin layered thin metal and elastomer laminae, said stacks being positioned relative to said rings and in bonded relation therewith with one stack being axially compressed while the other stack is subjected to axial tension loads in operation of the joint.

4. A swivel joint adapted for rocket engine nozzle supports which comprises a first ring adapted to be mounted on a rocket engine, a second ring adapted to mount a rocket nozzle, a collar carried by said first ring having a flange in spaced parallel overlapped relation below the first ring, a second collar carried by the second ring having a flange disposed in the space between the first ring and first collar, a first stack of thin laminae laminated bearing members in bonded relation between the first ring and second collar, a second stack of thin laminae bearing members in bonded relation between the flanges of the first and second collars, said stacks accommodating tilting of the second ring relative to the first ring, and said stacks complementing each other to absorb so that when the said first stack is under tension the said second stack will be under compression and when the said second stack is under tension the said first stack will be under compression, the said stacks complementing each other and absorbing loads in opposite directions.

5. A swivel joint especially adapted for mounting rocket nozzles on rocket engines which comprises a pair of rings in relatively tiltable relation, circumferentially spaced laminated bearing buttons between the rings in bonded relation thereto, circumferentially spaced finger members alternating with the bearings buttons and having spaced parallel overlapping flanges between the rings, said fingers carried by said rings whereby movement of said rings away from each other moves said flanges towards each other, and a second set of bearing buttons in circumferentially spaced relation between the first set between and bonded to the said flanges of the said fingers whereby thrust loads on the first set of bearing buttons will be absorbed by compression loads on the second set of bearing buttons, and thrust loads on the said second set of bearing buttons will be absorbed by compression loads on the first set of bearing buttons.

6. A bearing assembly comprising first and second bearing members in spaced apart opposed relation, first and second flange members portions of which are in spaced apart overlapping relationship, said portions between and spaced from said bearing members, said first flange member connected to said first bearing member, said second flange member connected to said second bearing member, first laminated bearing means positioned between and bonded to one of said bearing members and the said portion of one of said flange members, and second laminated bearing means positioned between and bonded to the said portions of both of said flange members, said bearing means including a plurality of alternate layers of elastomer and nonelastomer bonded together into bearing stacks, said stacks accommodating relative movement between the ends thereof by interparticle flow of the elastomer of said elastomer layers, whereby said first and second bearing members are held in spaced apart relation by said first and second laminated bearing means, one of said means subjected to compression load when the other of said means is subjected to tension load.

7. The assembly of claim 6 wherein the first and second laminated bearing means are first and second sets, each set including a plurality of individual bearing stacks, said first set is positioned between the said bearing members with the individual stacks of said first set in spaced relation, the said portions of the said flange members comprising a plurality of individual overlapping members arranged in pairs and spaced apart, the pairs of said overlapping portions positioned between and spaced from the individual stacks of the said first set and the individual stacks of the said second set positioned between the said portions.

References Cited

UNITED STATES PATENTS

| | | | |
|---|---|---|---|
| 1,263,252 | 4/1918 | Jencick | 285—404 X |
| 2,846,242 | 8/1958 | Drake | 285—263 |
| 2,900,182 | 8/1959 | Hinks | 308—2 X |
| 3,083,065 | 3/1963 | Hinks et al. | 267—57.1 X |
| 3,377,110 | 4/1968 | Boggs | 308—2 X |
| 2,323,216 | 6/1943 | Goldschmidt | 64—11 XR |
| 3,232,642 | 12/1966 | Cleff et al. | 285—263 X |

ARTHUR L. LA POINT, Primary Examiner

HOWARD BELTRAN, Assistant Examiner

U.S. Cl. X.R.

29—148.4; 60—271; 64—11; 170—160.53; 239—265.17, 265.35; 267—57.1; 285—51, 223, 238, 263, 404; 287—85, 87; 308—2, 26, 237